United States Patent
Hartley et al.

(10) Patent No.: US 8,416,933 B2
(45) Date of Patent: Apr. 9, 2013

(54) TRUSTED ENVIRONMENT FOR COMMUNICATION BETWEEN PARTIES

(75) Inventors: John Bryan Hartley, North Fitzroy (AU); Io Tong Lei, Doncaster East (AU); David Muscat, Hoppers Crossing (AU)

(73) Assignee: International Business Machines Corporation, Armonk, NY (US)

( * ) Notice: Subject to any disclaimer, the term of this patent is extended or adjusted under 35 U.S.C. 154(b) by 1194 days.

(21) Appl. No.: 12/261,180

(22) Filed: Oct. 30, 2008

(65) Prior Publication Data

US 2010/0111276 A1    May 6, 2010

(51) Int. Cl.
*H04M 1/56* (2006.01)

(52) U.S. Cl.
USPC .......................... 379/142.05; 379/114.14

(58) Field of Classification Search ............ 379/142.05
See application file for complete search history.

(56) References Cited

U.S. PATENT DOCUMENTS

| | | | |
|---|---|---|---|
| 5,818,920 A | 10/1998 | Rignell et al. | |
| 6,138,008 A | 10/2000 | Dunn et al. | |
| 6,453,327 B1 * | 9/2002 | Nielsen .......................... | 715/205 |
| 6,600,817 B1 | 7/2003 | Shaffer et al. | |
| 6,751,483 B1 | 6/2004 | Oh | |
| 6,757,830 B1 * | 6/2004 | Tarbotton et al. ............. | 713/188 |
| 6,934,543 B2 | 8/2005 | Wang et al. | |
| 7,058,180 B2 * | 6/2006 | Ferchichi et al. ............. | 380/247 |
| 7,130,452 B2 * | 10/2006 | Bolle et al. .................... | 382/115 |
| 7,149,801 B2 * | 12/2006 | Burrows et al. ............... | 709/225 |
| 7,263,528 B2 * | 8/2007 | Haff et al. ..................... | 707/622 |
| 7,286,658 B1 | 10/2007 | Henderson | |
| 7,475,118 B2 * | 1/2009 | Leiba et al. .................... | 709/206 |
| 7,971,061 B2 * | 6/2011 | Cordery et al. ............... | 713/170 |
| 2001/0036252 A1 | 11/2001 | Renner et al. | |
| 2003/0112945 A1 | 6/2003 | Brown et al. | |
| 2005/0008137 A1 | 1/2005 | Naito | |
| 2005/0070282 A1 | 3/2005 | Hinz | |
| 2005/0220288 A1 | 10/2005 | Huey | |
| 2006/0210032 A1 | 9/2006 | Grech et al. | |
| 2007/0081640 A1 | 4/2007 | Jachner | |
| 2007/0248220 A1 | 10/2007 | Crandell et al. | |
| 2007/0248230 A1 | 10/2007 | Shevmov et al. | |
| 2008/0240385 A1 | 10/2008 | Mikhailov | |
| 2009/0136015 A1 | 5/2009 | Roberts | |
| 2010/0080376 A1 | 4/2010 | Hartley et al. | |

FOREIGN PATENT DOCUMENTS

WO     WO9422259     9/1994

OTHER PUBLICATIONS

Sandford Bessler et al., "A Privacy Enhanced Service Architecture for Mobile Users", Proceedings of the 3rd Int'l Conf. on Pervasive Computing and Communications Workshops, Mar. 8-12, 2005, pp. 125-129.

(Continued)

*Primary Examiner* — Simon Sing
(74) *Attorney, Agent, or Firm* — Law Offices of Ira D. Blecker, P.C.

(57) ABSTRACT

A method of establishing communication including providing a communication by a sending party to a receiving party, and verifying the sending party's identity by a trusted instrumentality. The trusted instrumentality can be at least the sending party communication controller and is usually both the sending and receiving parties' communication controllers. The communication controllers should be certified and preferably be certified by a mutually trusted communication controller certification authority. Also disclosed is a system for establishing communication.

14 Claims, 2 Drawing Sheets

OTHER PUBLICATIONS

Dongmei Jing et al, "Personalization for SIP Multimedia Communications with Presence", 2005 IEEE, pp. 1365-1368.
Allen E. Milewski et al., "Providing Presence Cues to Telephone Users", Dec. 2000, CSCW'00: Proceedings of the 2000 ACM Conference on Computer Cooperative Work, pp. 89-96.

Office Action (Notification Date Jul. 12, 2011) for U.S. Appl. No. 12/241,206, filed Sep. 30, 2008, Confirmation No. 6695.
Amendment dated Oct. 12, 2011 to Office Action (Notification Date Jul. 12, 2011) for U.S. Appl. No. 12/241,206, filed Sep. 30, 2008, Confirmation No. 6695.

* cited by examiner

TRUSTED ENVIRONMENT FOR COMMUNICATION BETWEEN PARTIES

BACKGROUND OF THE INVENTION

This invention relates to the fields of computer systems and telephone communications. More particularly, a method is provided for establishing a communication connection between two parties without either party knowing or learning the other's private address.

Traditionally, when a caller wishes to establish a telephone connection with another party, he or she dials a telephone number associated with that party. However, the attempted call may fail for several reasons. For example, the called party may be busy or otherwise not available for taking a call, the caller may dial the wrong number, the called party may not be at the number that was dialed, etc.

When a call is placed but not answered, the caller may leave a voice mail message and thereby initiate a round of "telephone tag" as each party attempts to make contact with the other. Or, the voice mail message may be left on a telephone number that the called party checks only infrequently, thus delaying notification of the called party that a call is desired. In many cases, the parties will attempt to contact each other, and may leave a message, several times.

Thus, two inherent problems may be faced when attempting to complete a telephone call—"when" and "where" to reach the other party. More specifically, a caller may have little or no idea of the best time to try to reach his or her desired party, and may not know which telephone number (e.g., office, residence, mobile) provides the best chance of reaching that party at any given time. As a result, the caller may have to dial several numbers and/or leave several voice mail messages before connecting with the desired party.

Some attempts have been made to alleviate the problems of "when" or "where" to reach a party. Voice mail can be left for the called party, for example, and may be translated or transcribed into text or other form for delivery via electronic mail or other means. In addition, "follow me services" attempt to reach a called party at several numbers, perhaps simultaneously, in response to a call. They may try to connect to a called party at one or more telephone numbers, but because they are uninformed as to the called party's availability, they may be unsuccessful at reaching him or her. Existing solutions thus generally address only "when" or "where" to reach a party, but not both.

As another problem, a caller attempting to reach a party may have an identifier of that party, such as an electronic mail address or instant message user name, but not the party's telephone number. Traditional operator services cannot help the caller in this situation because the information possessed by the caller is not enough to enable the operator to locate a telephone number associated with the party. Without the party's telephone number, the caller cannot establish a telephone connection with the party.

In addition, when a caller directs a telephone call to a called party, the called party traditionally receives little, if any, information regarding the caller. The "caller id" service may provide a telephone number or name of a caller, but only if the called party subscribes to this service and the caller does not block the information. In addition, the name provided in a caller id field may not be the name of the actual caller.

The foregoing problems are compounded when the personal mobility of the called party is considered. Personal mobility is defined as the ability to allow a person to be accessible under the same identity irrespective of what network they are using and what device they are using to access that network. A personal mobility contact address meets this need such that a person can always be contacted regardless of his location. With personal mobility, it is necessary to allow such a personal mobility contact address to be established and published in a public directory while still maintaining the privacy of the person's underlying private contact address.

The previous approaches have recognized that privacy in communication is typically viewed as keeping the caller's identity private. Accordingly, the current solution is typically to maintain unlisted numbers in the world of telephony. The present inventors, however, have recognized that privacy is a negotiated agreement between the calling and called parties. That is, does the called party trust the calling party sufficiently to allow them to contact the called party.

Various approaches have been taken in regards to privacy. Wolff et al. WO94/22259, the disclosure of which is incorporated by reference herein, discloses call screening based on caller id. However, there is no attempt to determine if the caller id can be trusted.

Henderson U.S. Pat. No. 7,286,658, the disclosure of which is incorporated by reference herein, does not address privacy but instead is about triggering the display of data on a personal device (e.g., pager, personal digital assistant) based on it receiving a signal via a wireless communications device.

Brown et al. U.S. Patent Application Publication 2003/0112945, the disclosure of which is incorporated by reference herein, discloses a method whereby a telephone connection may be established between two parties without knowing the phone number of either party. A telephone system receives a personal identifier (e.g., telephone number, name) from the calling party which is used to inform the party to be called, who may then decide to take the call or take some other action. There is no attempt to verify the authenticity of the personal identifier of the calling party.

Crandell et al. U.S. Patent Application Publication 2007/0248220, the disclosure of which is incorporated by reference herein, discloses a method in which trusted identity between callers is established by providing system codes between the parties, which are used in combination with the calling party identifier to provide assurance of their identity. The difficulty with this kind of system is the required distribution of system codes between the parties and the consequent management of them.

Shevmov et al. U.S. Patent Application Publication 2007/0248230, the disclosure of which is incorporated by reference herein, discloses a method in which private identifiers are determined and used only by a wireless network so as to prevent unauthorized use of the network.

Bessler et al., "A Privacy Enhanced Service Architecture for Mobile Users", Proceedings of the $3^{rd}$ International Conference on Pervasive Computing and Communications Workshops (2005), the disclosure of which is incorporated by reference herein, discloses a service which allows individuals to access services without revealing their identity so as to ensure anonymity and privacy of individuals to network and services operators.

BRIEF SUMMARY OF THE INVENTION

The various advantages and purposes of the present invention as described above and hereafter are achieved by providing, according to a first aspect of the invention, a method of establishing communication, the method comprising the steps of:

providing a communication by a sending party to a receiving party; and verifying the sending party's identity by a trusted instrumentality.

According to a second aspect of the invention, there is provided a method of establishing communication comprising:

receiving a communication by a receiving party from a sending party;

verifying the sending party's identity by a trusted instrumentality; and handling the communication by the receiving party.

According to a third aspect of the invention, there is provided a method of establishing communication, the method comprising the steps of:

providing a public address by each of a sending party and a receiving party to a public directory;

requesting a communications session between the sending and receiving parties using the parties' respective public addresses;

verifying the sending party's identity by a trusted instrumentality; and handling the communication by the receiving party According to a fourth aspect of the invention, there is provided a computer readable storage medium storing instructions that, when executed by a computer, causes the computer to perform a method of establishing communication, the method comprising the steps of:

receiving a communication by a receiving party from a sending party;

verifying the sending party's identity by a trusted instrumentality; and handling the communication by the receiving party.

According to a fifth aspect of the invention, there is disclosed a system for establishing communication comprising:

a first communication controller for communicating by a first party;

a second communication controller for communicating by a second party;

a network connecting the first communication controller and the second communication controller; and trusted instrumentality for verifying the identity of the first party sending a communication to the second party.

BRIEF DESCRIPTION OF THE DRAWINGS

The features of the invention believed to be novel and the elements characteristic of the invention are set forth with particularity in the appended claims. The Figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

Figure 1:
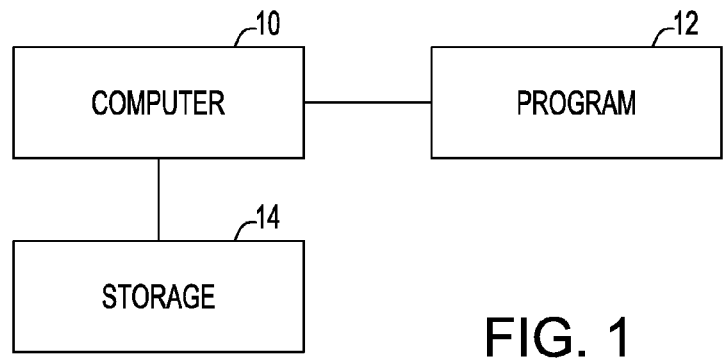
FIG. 1 is a block diagram that illustrates one exemplary hardware environment of the present invention.

The program environment in which a present embodiment of the invention is executed illustratively incorporates a general-purpose computer or a special purpose device such as a hand-held computer. FIG. 1 is a block diagram that illustrates one exemplary hardware environment of the present invention. The present invention is typically implemented using a computer 10 comprised of microprocessor means, random access memory (RAM), read-only memory (ROM) and other components. The computer may be a personal computer, mainframe computer or other computing device. Resident in the computer 10, or peripheral to it, will be a storage device 14 of some type such as a hard disk drive, floppy disk drive, CD-ROM drive, tape drive or other storage device.

Generally speaking, the software implementation of the present invention, program 12 in FIG. 1, is tangibly embodied in a computer-readable medium such as one of the storage devices 14 mentioned above. The program 12 comprises instructions which, when read and executed by the microprocessor of the computer 10 causes the computer 10 to perform the steps necessary to execute the steps or elements of the present invention.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

The present invention is directed to allowing the identity or, more specifically the personal mobility contact address of a person, to be established and published in a public directory while still maintaining the privacy of the person's underlying private contact address. To achieve this result requires that any calling person's identity be verified prior to applying contact rules against the calling person's identity to determine what action should be taken for this contact attempt. This allows the called person to have the convenience of personal mobility without the nuisance of getting unwanted communications such as spam calls, prank calls, etc.

The present invention is generic in that it can be applied to any form of network enabled communication. That is, the present invention has applicability to a telecommunication environment wherein a calling party attempts to contact a called party. Likewise, the present invention also has applicability to an email environment wherein a party sending an email wishes to make contact with a person receiving an email. The present invention may also have applicability to texting and instant messaging modes of communication as well. To solidify the generic applicability of the present invention, the calling party or party sending an email, text message or instant message will hereafter be referred to generically as the sending party while the called party or party receiving an email, text message or instant message will hereafter be referred to generically as the receiving party.

Figure 2:
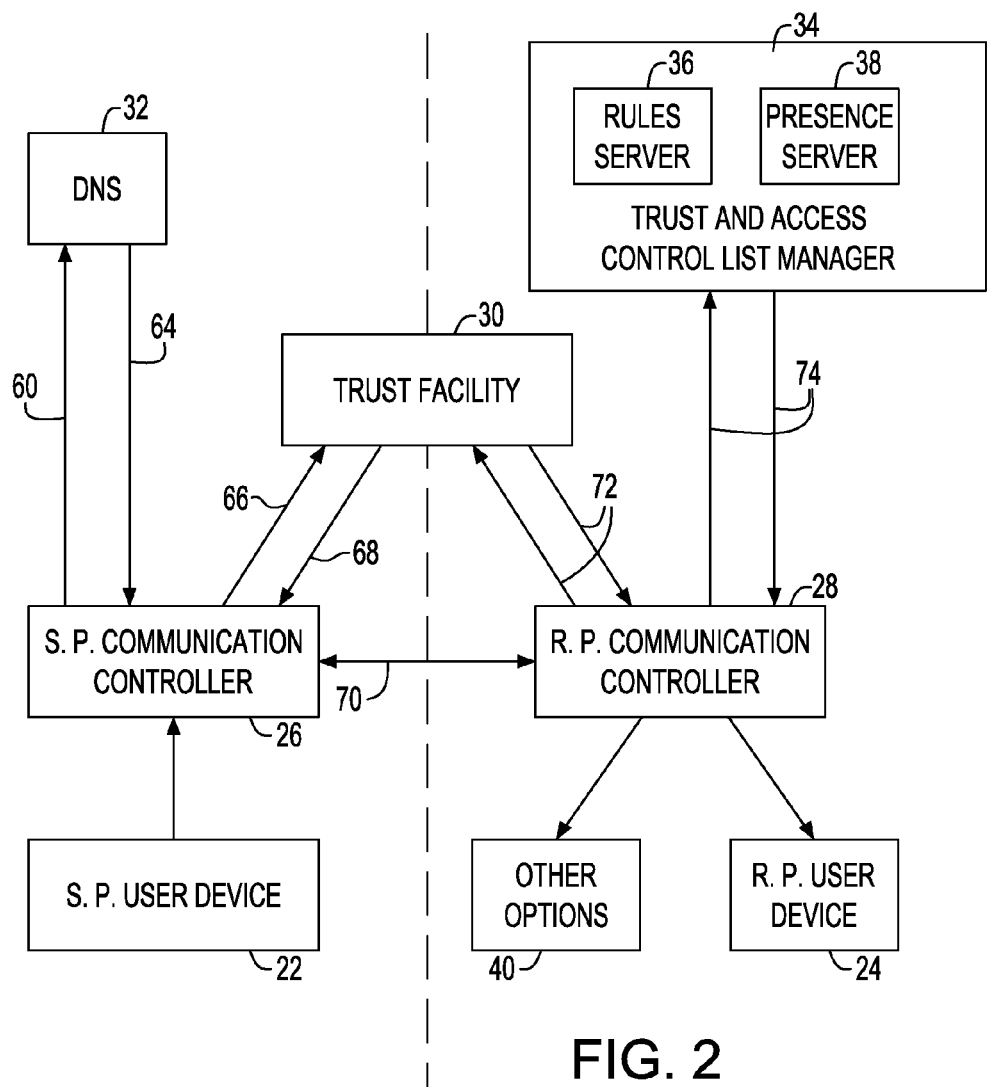
FIG. 2 is a block diagram of the overall system components and functions that form a part of the present invention.
Figure 3:
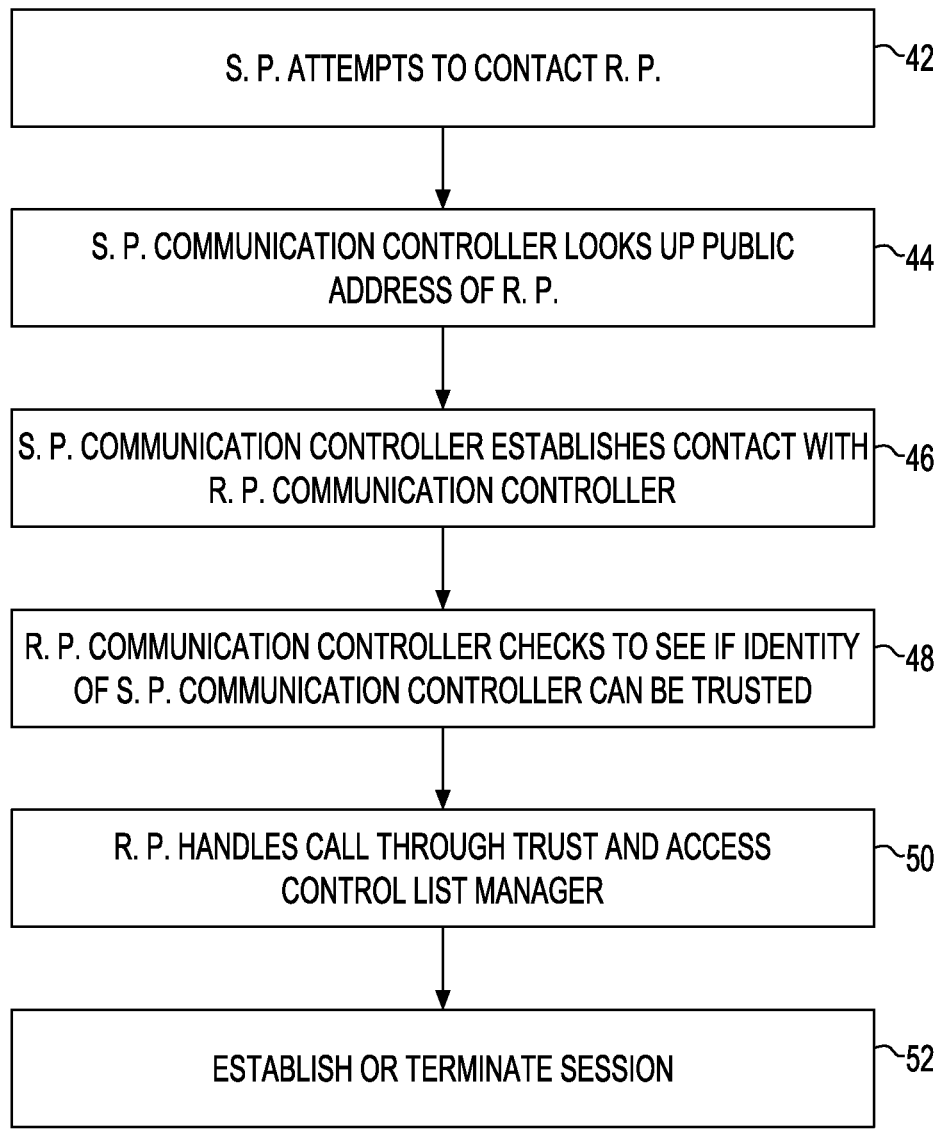
FIG. 3 is a flow chart of the method of the present invention.

Turning now to FIGS. 2 and 3, the method of the present invention will be described in detail.

FIG. 2 will first be described. FIG. 2 is a block diagram of the overall system components and functions that form a part of the present invention for networked communication between a sending party and a receiving party. It is noted that in FIG. 2, there is a dashed line going down the center. Everything to the left of the dashed line 20 is a hardware component or function for the sending party while everything to the right of the dashed line 20 is a hardware component or function for the receiving party.

Still referring to FIG. 2, there is illustrated a sending party user device 22 and a receiving party user device 24. The respective user devices 22, 24 may also be called user agents. The respective user devices 22, 24 may be, for example, telephones such as public switched telephone network phones (PSTN) if the communication is by telephony or computers if the communication is by email. PSTN is the network of the world's public circuit-switched telephone networks. For voice over internet protocol (VoIP) calling, the user devices 22, 24 could be a combination of PSTN phones and a VoIP gateway. VoIP means Voice-over-Internet Protocol and is a protocol optimized for the transmission of voice through the Internet or other packet-switched networks. VoIP may also be referred to as IP telephony, Internet telephony, voice over broadband, broadband telephony and broadband phone. The user devices 22, 24 could also be personal digital assistants or cell phones which are capable of communicating by both telephony and email. Each party has a communication controller such as a sending party communication controller 26 and receiving party communication controller 28. The respective communication controllers 26, 28 are preferably session initiation protocol (SIP) enabled servers. SIP is a signaling protocol widely used for setting up and tearing down multimedia communication sessions such as voice and video calls over the internet. The communication controllers 26, 28 are connected to their respective user devices 22, 24 and form a part of the network for communication between the sending and receiving parties.

Still referring to FIG. 2, block 30 represents a trust facility through which at least the sending party communication controller 26 is certified. As part of the certification process, the sending party communication controller 26 ensures that the sending party user device 22 has authenticated access to the network and to the sending party communication controller 26. The certification can be by a mutually trusted source that both the sending party and receiving party trust. The trusted source can be a certification authority directly or one that has been certified by the certification authority. In one preferred embodiment, the trusted source is the International Telecommunications Union (ITU) or bodies underneath the ITU which have been certified directly or indirectly by the ITU.

In one preferred embodiment, only the sending party communication controller 26 is certified. This is because the receiving party needs to verify the identity of the sending party for a simple communication but the reverse may not be true. However, as a practical matter, the receiving party communication controller 28 should be certified as well since the receiving party may want to send a confirmation message that the communication from the sending party has been received and so certification is necessary so that the sending party can trust the reply that it receives. In addition, while one party is the receiving party with respect to the communication described above, the receiving party will become the sending party for other communications and so it is advantageous for the receiving party to be certified as well. As discussed above with respect to the sending party communication controller 26, the receiving party communication controller 28 ensures that the receiving party user device 24 has authenticated access to the network and the receiving party communication controller 28.

It should be noted that just as communication controllers 26, 28 can be certified, any certification can instantly revoked through the certification authority revocation list.

Also shown in FIG. 2 is a Domain Name System (DNS) 32 in which both the sending party and receiving party register their public addresses. The DNS associates various information with domain names; most importantly, it serves as the "phone book" for the Internet by translating human-readable computer hostnames, e.g. www.example.com, into IP addresses, e.g. 208.77.188.166, which networking equipment needs to deliver information. A DNS also stores other information such as the list of mail servers that accept email for a given domain. By providing a worldwide keyword-based redirection service, the DNS is a component of contemporary Internet use.

On the right hand side of FIG. 2, the receiving party also has a Trust and Access Control List Manager which determines the handling of the communication when the receiving party receives it. In one preferred embodiment, the Trust and Access Control List Manager comprises a rules server 36 which specifies the behavior and access that will be provided to the sending party and a presence server 38 which notes the status (available, not available, offline, on vacation, etc.) of the receiving party.

While in some cases, the communication will be sent directly to the receiving party user device 24, the communication instead may be responded to in other ways such as dumping to voicemail, refusing communication, redirecting to another address, etc. These other options are denoted by box 40 in FIG. 2.

Referring now to FIGS. 2 and 3 simultaneously, the method of the present invention will be described with respect to the hardware and functions just described with respect to FIG. 2. It is assumed for the following description of the present invention that the sending and receiving parties have previously registered their public addresses with the DNS 32. In the first step of the process shown in block 42 of FIG. 3, the sending party attempts to contact the receiving party. Referring back to FIG. 2, the sending party uses its user device 22 and communication controller 26 to attempt to establish the communication link with the receiving party. The sending party may enter the public contact address for the receiving party which as noted above could be the personal mobility address (phone number, email address, etc.) for the receiving party.

In the next block 44 of FIG. 3, the sending party communication controller 26 looks up the receiving party public address in the DNS 32. As indicated by arrow 60 in FIG. 2, the sending party communication controller 26 does a lookup in DNS 32. In return, the DNS 32 returns an encrypted public address for the receiving party as indicated by arrow 64.

In the next block 46 of FIG. 3, the sending party communication controller 26 contacts the receiving party communication controller 28 through a network, indicated by arrow 70 in FIG. 2.

However, before communication with the receiving party communication controller 28 is attempted, the sending party communication controller 26 should have been certified by the trust facility 30 or some other methodology so that the receiving party communication controller 28 can trust the identity of the sending party communication controller 26. This is represented by arrows 66, 68 in FIG. 2. In one embodiment of the present invention, the receiving party communication controller 28 may disallow the communication if the communication comes from an untrusted source such as an uncertified sending party communication controller.

While the receiving party communication controller 28 can trust the identity asserted by a certified sending party communication controller 26, an aspect of getting the sending party communication controller 26 certified is that it ensures that the sending party user device 22 has authenticated access to the network and to the sending party communication controller 26. Thus, the sending party user device 22 must provide some form of credentials and authorization to the sending party communication controller 26. Once this is done, the sending party communication controller 26 is able to assert and guarantee the identity that is passed to the receiving party communication controller 28.

The authentication of the sending party user device 22 can be via any of user identification/password or Subscriber Identity Module (SIM)-based network authentication (e.g., GSM mobile phone network) or simply by the fact that the sending party user device 22 is operating in a private network that is not readily breachable (ie PSTN/traditional phone network, which is a "closed shop", wherein the "dialing phone number" is used as its identity). In the case of a VoIP network, it would typically be the case that the user (sending party) would login to the sending party communications controller 26, just the same way they log in to their mail system.

The foregoing discussion applies in a similar manner to the receiving party communication controller 28 and receiving party user device 24.

In the next block 48 of FIG. 3 and also represented by arrows 72 in FIG. 2, the receiving party communication controller 28 checks, indicated by arrows 72 in FIG. 2, with the trust facility 30 to see if the sending party communication controller 26 has been certified so that it can be trusted. In one embodiment of the present invention, at least the sending party communication controller 26 has been certified. Most preferably, however, both of the sending and receiving parties' communication controllers 26, 28 are certified. In the verification step represented by block 48 of FIG. 3, the trusted instrumentality is at least the sending party communication controller 26 and most preferably is both the sending and receiving parties' communication controllers 26, 28.

In the next block 50 of FIG. 3, the receiving party handles the communication through the Trust and Access Control List Manager 34 also indicated by arrows 74 in FIG. 2. The receiving party has previously established rules in the rules server 36 so that the Trust and Access Control List Manager 34 can handle the communication according to these rules. If the sending party communication controller 26 has not been certified, then the Trust and Access Control List Manager 34 may, for example, dump the communication to voicemail and through the presense server 38 show the receiving party as not available. Although unlikely, the receiving party could decide to answer the communication anyways even though it is not trusted.

In the event that the receiving party communication controller 28 is not able to verify the authenticity of the sending party's identity due to the communication coming from an uncertified communication controller, then this information is passed as a parameter to the Trust and Access Control List Manager 34 which will make a determination as to how to handle the communication based on the receiving party's preconfigured communication behavior selections. The Trust and Access Control List Manager 34 can also flag to indicate that the identity of the sending party has not been validated.

If the sending party communication controller 26 has been certified, then the Trust and Access Control List Manager 34 can handle the communication in a number of ways. For purposes of illustration and not limitation, the below is a list of some possible options for handling the communication:
  flag to indicate that identity of sending party has been validated;
  disallow;
  dump to voicemail;
  allow communication to proceed to receiving party user device;
  redirect to another address;
  display presence;
  return acknowledgement;
  return "out of office" message; and/or
  return encrypted private address of receiving party.

A valuable aspect of the present invention is that the sending party can be flagged to the receiving party as coming from an untrusted or a trusted source. The flagging is an explicit indication to the receiving party as to whether the communication can be trusted. In this new era of phishing and other fraudulent activities, the ability to notify the receiving party of potential dangers with respect to the incoming communication is very useful.

The Trust and Access Control List Manager 34 may maintain a list of parties for which the receiving party has configured special call completion rules. The receiving party may modify such a list as he or she desires. By way of illustration, such a list may specify that certain pre-approved (or unapproved) parties may (or may not) be connected immediately when the receiving party communication controller 28 receives a communication for the receiving party. In general, a receiving party may establish rules or guidelines for handling a communication, based on virtually any criteria (e.g., caller identity, time, subject of call).

A receiving party's availability may be determined by applying a set of default rules (which may be customized by the receiving party), by receiving an availability update regarding the receiving party, by determining whether the receiving party is currently using his or her telephone, computer or other communication device, or through another mechanism that indicates whether he or she is available or unavailable.

A receiving party's availability (or unavailability) may be limited to certain types or categories of communications, or communications matching other parameters or criteria. For example, one parameter for classifying communications may involve priority. The receiving party may therefore indicate that he is currently available for emergency or urgent communications, but not for routine communications. Another criterion may involve an identity, position or title of another party to the communication. The receiving party may therefore indicate that he is available only for calls with specified parties.

Other categories may involve the nature of a communication (e.g., work-related, personal), time or date (e.g., weekday, weekend, day, night, office hours), desired method of completion (e.g., VoIP, land-line), subject of the communication, the identifier of the receiving party that was provided by the sending party, etc.

In any response, the receiving party would send back certain receiving party attributes such as name, location, etc and would be signed using the receiving party's private address which would allow the sending party's communication controller 26 to confirm that the response does indeed come from the receiving party.

In the last block 52 of FIG. 3, the communication session is established or terminated. At this point, the communication is actually dealt with in one of the ways indicated above. If the communication is not trusted, the communication session would usually be terminated.

The use of certified gateways ensures that information that is published in the DNS 32 or other similar public directory does not get abused and result in call or email flooding due to spam, or allow snooping and identification determination by reverse number lookup. By introducing the need for mutual authentication via certified gateways, it is trivial to reject any communications that are made via uncertified entry points by simply choosing to reject any calls flagged as being from non-verified callers.

It will be apparent to those skilled in the art having regard to this disclosure that other modifications of this invention beyond those embodiments specifically described here may be made without departing from the spirit of the invention.

Accordingly, such modifications are considered within the scope of the invention as limited solely by the appended claims.

The invention claimed is:

1. A method of establishing communication, the method comprising the steps of:
   providing a communication by a sending party to a receiving party; and
   verifying the sending party's identity by a trusted instrumentality wherein the trusted instrumentality is a certified sending party communication controller and a certified receiving party communication controller and wherein at least the certified sending party communication controller has been certified by a third party communication controller certification authority that is mutually trusted by the sending party and receiving party.

2. A method of establishing communication comprising:
   receiving a communication by a receiving party from a sending party;
   verifying the sending party's identity by a trusted instrumentality wherein the trusted instrumentality is a certified sending party communication controller and a certified receiving party communication controller and wherein at least the certified sending party communication controller has been certified by a third party communication controller certification authority that is mutually trusted by the sending party and receiving party; and
   handling the communication by the receiving party.

3. A method of establishing communication, the method comprising the steps of:
   providing a public address by each of a sending party and a receiving party to a public directory;
   requesting a communications session between the sending and receiving parties using the parties' respective public addresses comprising contacting the receiving party through the sending party communication controller;
   verifying the sending party's identity by the receiving party through a trusted instrumentality wherein the trusted instrumentality is a certified sending party communication controller and a certified receiving party communication controller, the receiving party checking that the certified sending party communication controller has been certified by a third party communication controller certification authority that is mutually trusted by the sending party and receiving party; and
   handling the communication by the receiving party.

4. The method of claim 3 wherein the step of contacting the receiving party comprises looking up the receiving party's public address, contacting the receiving party communication controller and providing the public address of the sending party to the receiving party communication controller.

5. The method of claim 3 wherein the step of handling comprises explicitly indicating to the receiving party that the identity of the sending party has been validated by the receiving party communication controller and performing an action according to rules predetermined by the receiving party.

6. The method of claim 3 wherein the step of handling comprises explicitly indicating to the receiving party that the identity of the sending party has not been validated by the receiving party communication controller such that the communication cannot be trusted by the receiving party and performing an action according to rules predetermined by the receiving party.

7. A computer readable storage medium storing instructions that, when executed by a computer, causes the computer to perform a method of establishing communication, the method comprising the steps of:
   receiving a communication by a receiving party from a sending party;
   verifying the sending party's identity by the receiving party through a trusted instrumentality wherein the trusted instrumentality is a certified sending party communication controller and a certified receiving party communication controller, the receiving party checking that the certified sending party communication controller has been certified by a third party communication controller certification authority that is mutually trusted by the sending party and receiving party; and
   handling the communication by the receiving party.

8. The computer readable storage medium of claim 7 wherein the step of handling comprises explicitly indicating to the receiving party that the identity of the sending party has been validated by the receiving party communication controller and performing an action according to rules predetermined by the receiving party.

9. The computer readable storage medium of claim 7 wherein the sending party communication controller and receiving party communication controller have been certified by a third party communication controller certification authority that is mutually trusted by the sending party and receiving party.

10. The computer readable storage medium of claim 9 further comprising the step of sending a trusted response by the receiving party communication controller to the sending party communication controller.

11. The computer readable storage medium of claim 7 wherein the step of handling comprises explicitly indicating to the receiving party that the identity of the sending party has not been validated by the receiving party communication controller such that the communication cannot be trusted by the receiving party and performing an action according to rules predetermined by the receiving party.

12. A system for establishing communication comprising:
   a first communication controller for communicating by a first party;
   a second communication controller for communicating by a second party;
   a network connecting the first communication controller and the second communication controller; and
   a trusted instrumentality for verifying the identity of the first party sending a communication to the second party wherein the trusted instrumentality is certification of the first communication controller and second communication controller by a third party communication controller certification authority that is mutually trusted by the first party and second party.

13. The system of claim 12 further comprising a first user device connected to the first communication controller and a second user device connected to the second communication controller, the first and second user devices forming a part of the network.

14. The system of claim 13 wherein the first user device has been authenticated to the first communication controller and to the network and the second user device has been authenticated to the second communication controller and to the network.

* * * * *